(12) United States Patent
Steinich et al.

(10) Patent No.: US 8,384,376 B2
(45) Date of Patent: Feb. 26, 2013

(54) MAGNETIC ANGLE SENSOR

(75) Inventors: Klaus Manfred Steinich, Zorneding (DE); Peter Wirth, Eching (DE)

(73) Assignee: ASM Automation Sensorik Messtechnik GmbH, Moosinning (DE)

( * ) Notice: Subject to any disclaimer, the term of this patent is extended or adjusted under 35 U.S.C. 154(b) by 632 days.

(21) Appl. No.: 12/460,464

(22) Filed: Jul. 20, 2009

(65) Prior Publication Data
US 2010/0013466 A1 Jan. 21, 2010

(30) Foreign Application Priority Data

Jul. 18, 2008 (DE) .......................... 10 2008 033 769
May 13, 2009 (DE) .......................... 10 2009 021 081

(51) Int. Cl.
*G01B 7/30* (2006.01)

(52) U.S. Cl. ........... 324/207.25; 324/207.2; 324/207.21; 324/207.22; 324/174; 33/1 PT; 338/32 R

(58) Field of Classification Search ............. 324/207.25, 324/207.2, 207.21, 207.22, 174; 33/1 PT; 338/32 R
See application file for complete search history.

(56) References Cited

U.S. PATENT DOCUMENTS

| | | | | |
|---|---|---|---|---|
| 3,613,000 A * | 10/1971 | Weir et al. ...................... 324/174 |
| 3,777,273 A * | 12/1973 | Baba et al. ..................... 335/236 |
| 3,875,920 A * | 4/1975 | Williams ....................... 123/617 |
| 4,316,144 A * | 2/1982 | Levijoki ........................ 324/174 |
| 4,380,928 A * | 4/1983 | Iwasaki ...................... 324/207.25 |
| 4,503,391 A * | 3/1985 | Hinke ...................... 324/207.22 |
| 4,570,118 A * | 2/1986 | Tomczak et al. ............ 324/207.2 |
| 4,646,042 A * | 2/1987 | Eshelman ...................... 335/205 |
| 4,646,088 A * | 2/1987 | Inoue ......................... 340/870.31 |
| 4,691,185 A * | 9/1987 | Loubier et al. ............... 338/32 H |
| 4,717,874 A * | 1/1988 | Ichikawa et al. .......... 324/207.16 |
| 4,983,915 A * | 1/1991 | Rossi ........................ 324/207.17 |
| 5,004,981 A * | 4/1991 | Hashimoto et al. ....... 324/207.22 |
| 5,053,659 A * | 10/1991 | Parker .......................... 310/68 E |
| 5,248,939 A * | 9/1993 | Brauer ........................... 324/174 |
| 5,307,013 A * | 4/1994 | Santos et al. ................ 324/207.2 |
| 5,394,082 A * | 2/1995 | Schiessle et al. ......... 324/207.22 |
| 5,627,465 A * | 5/1997 | Alfors et al. ................ 324/207.2 |
| 6,064,197 A * | 5/2000 | Lochmann et al. ....... 324/207.14 |
| 6,072,312 A * | 6/2000 | Van Den Berg .......... 324/207.16 |
| 6,084,400 A * | 7/2000 | Steinich et al. ........... 324/207.13 |
| 6,107,794 A * | 8/2000 | Kipp et al. ................ 324/207.23 |
| 6,201,389 B1 * | 3/2001 | Apel et al. .................. 324/207.2 |
| 6,260,423 B1 * | 7/2001 | Garshelis ................. 73/862.336 |
| 6,304,079 B1 * | 10/2001 | Kenjo et al. .............. 324/207.21 |
| 6,481,655 B1 * | 11/2002 | Feigel, Jr. ...................... 241/294 |
| 6,522,131 B1 * | 2/2003 | Hiligsmann et al. ....... 324/207.2 |

(Continued)

FOREIGN PATENT DOCUMENTS

EP 1503182 A1 7/2004

*Primary Examiner* — Patrick Assouad
*Assistant Examiner* — Lamarr Brown
(74) *Attorney, Agent, or Firm* — Head, Johnson & Kachigian, P.C.

(57) ABSTRACT

In order to be able to measure over more than 360° with a magnetic angle sensor, it is proposed not to adjust the distance between the encoder magnet and the sensor element in addition to the rotation, e.g. by means of a thread, like in the prior art, but to maintain said distance constant, but instead to adjust a magnetic variator with respect to its axial distance from the sensor element, or also in transversal direction, which variator can be a flux conductor or also a secondary magnet.

23 Claims, 9 Drawing Sheets

U.S. PATENT DOCUMENTS

| | | | |
|---|---|---|---|
| 6,556,005 B1* | 4/2003 | Oomkes | 324/207.2 |
| 6,568,091 B1* | 5/2003 | Li et al. | 33/1 PT |
| 6,590,387 B2* | 7/2003 | Miller | 324/207.13 |
| 6,894,487 B2* | 5/2005 | Kunz-Vizenetz | 324/207.25 |
| 7,075,290 B2* | 7/2006 | Collier-Hallman et al. | 324/163 |
| 7,239,129 B2* | 7/2007 | Steinich | 324/207.13 |
| 7,392,597 B2* | 7/2008 | Steinich | 33/733 |
| 7,466,725 B2* | 12/2008 | Ichimura et al. | 372/2 |
| 7,612,315 B2* | 11/2009 | Corradini | 219/401 |
| 7,780,216 B2* | 8/2010 | Jahn et al. | 296/107.09 |
| 7,855,552 B2* | 12/2010 | Steinich | 324/207.25 |
| 2003/0182809 A1* | 10/2003 | Enzinna | 33/1 PT |
| 2005/0200352 A1* | 9/2005 | Haga et al. | 324/207.21 |
| 2005/0212508 A1* | 9/2005 | Damitz et al. | 324/207.2 |
| 2005/0230178 A1* | 10/2005 | Chikaraishi et al. | 180/444 |
| 2006/0028203 A1* | 2/2006 | Kawashima et al. | 324/207.25 |
| 2007/0001668 A1* | 1/2007 | Mock et al. | 324/207.22 |
| 2007/0139041 A1* | 6/2007 | Steinich | 324/207.22 |
| 2007/0268015 A1* | 11/2007 | Hatanaka et al. | 324/207.25 |
| 2008/0048653 A1* | 2/2008 | Sanders | 324/207.25 |
| 2008/0164866 A1* | 7/2008 | Steinich et al. | 324/207.2 |
| 2008/0164867 A1* | 7/2008 | Steinich et al. | 324/207.2 |
| 2008/0197838 A1* | 8/2008 | Fischer | 324/207.25 |
| 2008/0265876 A1* | 10/2008 | Lee et al. | 324/207.21 |
| 2009/0072816 A1* | 3/2009 | Schrubbe et al. | 324/207.2 |
| 2009/0115409 A1* | 5/2009 | Arinaga et al. | 324/207.25 |
| 2009/0211374 A1* | 8/2009 | Oike et al. | 73/862.08 |
| 2009/0315544 A1* | 12/2009 | Takahashi et al. | 324/207.25 |
| 2010/0156398 A1* | 6/2010 | Steinich | 324/207.13 |
| 2010/0177488 A1* | 7/2010 | Rhodes et al. | 361/748 |
| 2010/0201353 A1* | 8/2010 | Duppe et al. | 324/207.25 |
| 2010/0271014 A1* | 10/2010 | Arns et al. | 324/207.25 |
| 2011/0260718 A1* | 10/2011 | Hirning | 324/207.25 |
| 2011/0296698 A1* | 12/2011 | Busse-Grawitz et al. | 33/1 PT |
| 2012/0068694 A1* | 3/2012 | Mitamura et al. | 324/207.25 |
| 2012/0112676 A1* | 5/2012 | Doornenbal | 318/400.39 |

* cited by examiner

MAGNETIC ANGLE SENSOR

CROSS-REFERENCE TO RELATED APPLICATIONS:

This U.S. application claims priority to German Patent Application No. 102008033769.2 filed 18 Jul. 2008 and to German Patent Application No. 102009021081.4 filed 13 May 2009, each of which is incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

FIELD OF THE INVENTION

The invention relates to a magnetic angle sensor, which is capable of measuring angles of rotation in excess of 360°, in particular over a plurality of revolutions.

As a matter of principle, a magnetically sensitive sensor element is used for a magnetic angle sensor, which sensor element is mostly provided as a sensor chip, opposite to which sensor element, an encoder magnet mostly provided as a permanent magnet is rotatably disposed. Thus, the sensor element measures the magnetic field or its change in the form of magnetic induction or in the form of magnetic flux, which correlates with the magnetic field strength H over a material's constant H.

Thus, the sensor element is at least capable to determine the partial rotation angle of the encoder magnet between 0° and 360°. The necessary knowledge of the additionally performed complete revolutions of the encoder magnet, which add up to form the total rotation angle, is acquired in different ways.

Thus, EP 0 1503182 uses a sensor element, which additionally measures also the magnetic field provided at the sensor element, and moves the encoder magnet during its rotation axially along a threaded spindle towards the microchip, which is disposed transversal to said axial direction and which constitutes the sensor element.

Said solution has several disadvantages, e.g. that there is no linear context between the approach of the encoder magnet and the field alteration at the sensor element.

In order to compensate this, either a very complicated processing algorithm for the amount of field alteration is required at the sensor element, or the approach of the encoder magnet to the sensor element, which is a function of the number of revolutions has to follow an analog non linear function, which causes a very complex mechanical fabrication as a matter of principle.

BRIEF SUMMARY OF THE INVENTION

Thus, it is the object of the invention to provide an angle sensor measuring over plural rotations, which is simple and economical in construction, and in which in particular the distance of the encoder magnet from the sensor element remains constant.

Said object is accomplished through the features of patent claim 1. Advantageous embodiments can be derived from the dependent claims.

The distance between the encoder magnet and the sensor element can remain unchanged, when the angle sensor according to the invention additionally comprises a field variator, through which the magnetic field provided at the sensor element is changed as a function of the total rotation angle, which was covered by the encoder magnet.

Such a variator can be implemented in different ways.

In a preferred embodiment, the variator is comprised of a flux conductor component, e.g. made of soft iron, which, contrary to the material of a permanent magnet, can be machined in a simple and highly precise manner, so that precise threads, guides and similar can be machined therein without increased complexity, and/or the variator is also comprised of a magnetically permeable liquid.

By approaching or removing such a flux conductor component, e.g. provided as a flat element from the backside of the encoder magnet or also from the backside of the sensor element, again respectively as the function of the total rotation angle of the encoder magnet, which is subsequently not explicitly repeated with each movement of the variator, the magnetic field variation, which is caused by the invariably offset encoder magnet and which is measurable at the sensor element, changes.

The same applies when such a flux conductor component is increasingly inserted in transversal direction between the encoder magnet and the sensor element, which quasi generates a magnetic shunt. When this is performed synchronously by two or plural flux conductor components, disposed opposite to one another and evenly distributed over the circumference, a certain type of magnetic aperture is thus created.

The desired effect can also be accomplished by sliding a tubular- or pot shaped flux conductor component with its open face forward over the encoder magnet or over the sensor element from behind to an increasing extent. Thus, the encoder magnet can also be provided annular in a plane parallel to the sensor element, and such a flux conductor component can additionally comprise a center pin in its center, which center pin thus also penetrates into the inner cavity of the annular encoder magnet. Thus, e.g. a threaded spindle with a spindle nut running thereon can be used for moving the flux conductor component.

Another option is comprised in that the encoder magnet is made of two encoder magnet components offset in transversal direction and the flux conductor component is pushed forward between the two encoder magnet components in axial direction, thus along the axis of rotation, which is preferably a common axis of rotation for the two encoder magnet components.

Thus, when the threaded spindle comprises a constant pitch, it can also be accomplished through a respective shape of the flux conductor component, e.g. through the amount of cross section variation of the flux conductor component in its movement direction, that a linear relationship is provided between the rotating movement of the encoder magnet and the field alteration at the sensor element.

If this linear relationship can be accomplished through a non-constant variable pitch of the threaded spindle, the spindle as well as the nut is simpler in configuration than in the prior art, since none of said elements is made of a magnetic material.

The variator, however can also be a secondary magnet instead of a flux conductor component, where the pole orientation of said secondary magnet is then preferably axial, or the variator can also be a combination of such a secondary magnet and a flux conductor component.

Thus, quite different mechanical solutions can be envisioned.

Another option of implementing a variator is comprised in not using a permanent magnet as encoder magnet, but an electric magnet, and in controlling the magnetic force of said encoder magnet as a function of its total rotation angle. Thus, no mechanical approaching or removing an element to and from the sensor element is necessary anymore.

With respect to processing the signals put out by the sensor element for the partial rotation angle of the encoder magnet, or also processing said signals added up to form a total rotation angle, by the connected processing unit, which sensor element and processing unit jointly form the sensor unit, interpolation values should be stored in a memory of the processing unit, which correspond to integer complete revolutions. Said interpolation values can be determined again with increasing wear or aging of the angle sensor, preferably they are determined automatically in defined time intervals.

Said interpolation values are determined and stored for the first time when the angle sensor is operated for the first time.

Among other things, said interpolation values are used for detecting the current total rotation position of the encoder magnet, if the threaded spindle and the spindle nut employed in a mechanical drive of the encoder magnet come out of engagement due to a provided end stop, and by means of an overturning safety, which prevents mechanical damages when running over the end stop, the spindle and the nut subsequently come back into engagement.

Thus, the sensor unit may not only comprise one sensor element, thus typically a sensor chip. It is proposed according to the invention to use at least two sensor elements, thus typically two sensor chips.

Thus, it is possible according to the tasks of said two sensor elements to detect and put out, on the one hand, the partial rotation angle of the encoder magnet, and, on the other hand, to detect and put out the distance between variator and sensor element, to provide a sensor element respectively optimized for said tasks.

With respect to the geometric disposition, thus preferably the sensor element, which determines the partial rotation angle of the encoder magnet, is disposed centrally, thus on the rotation axis of the encoder magnet, while the second sensor element applicable for determining the distance can be disposed closely adjacent, since the consequences herein are less severe.

BRIEF DESCRIPTION OF THE DRAWINGS

Embodiments according to the invention are subsequently described in more detail in an exemplary manner with reference to drawings, wherein.

DETAILED DESCRIPTION OF THE INVENTION

Figure 1A:
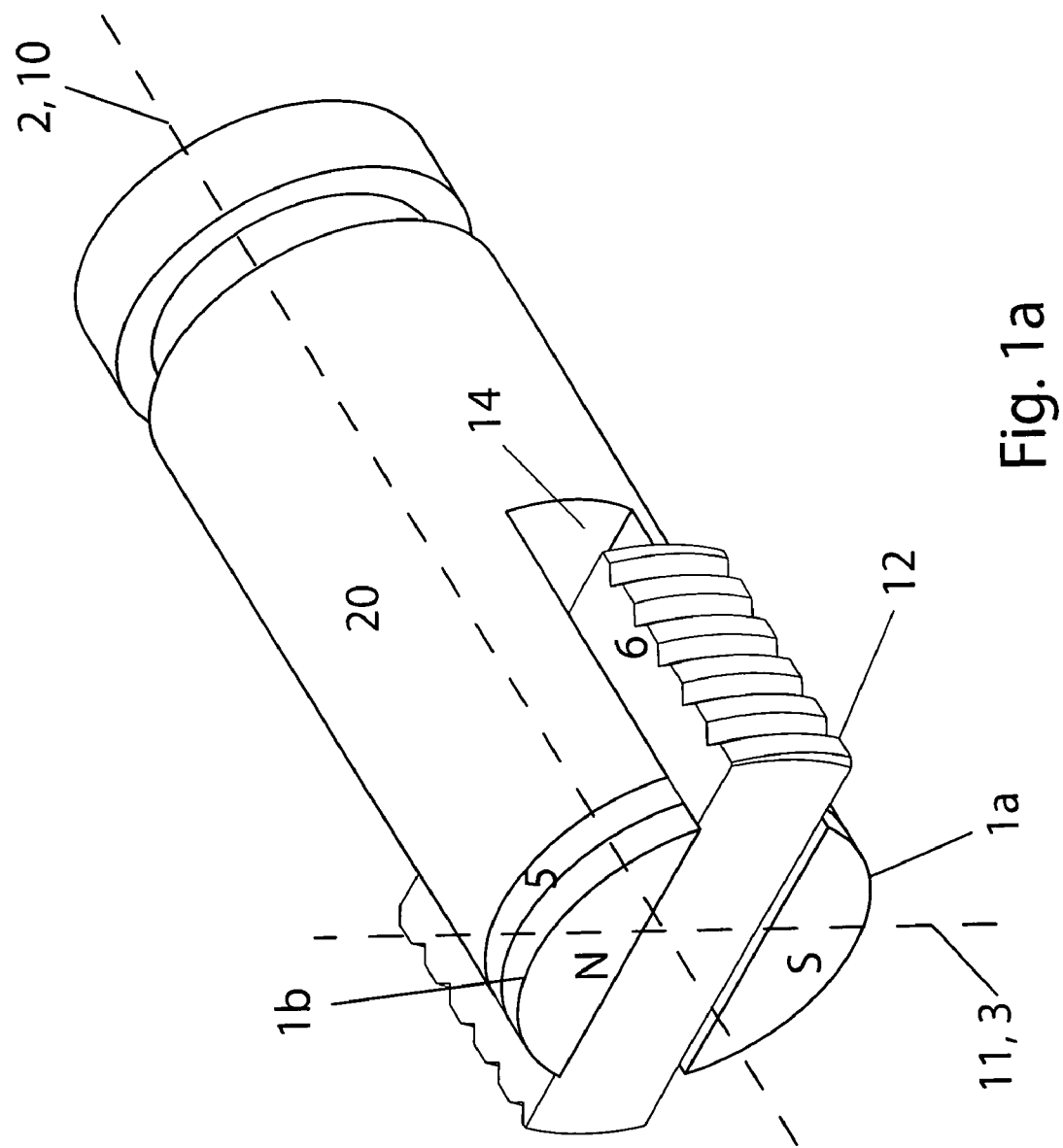
FIGS. 1(a)-(e) show a solution with a variator, which can be axially inserted between the magnets.
Figure 1B:
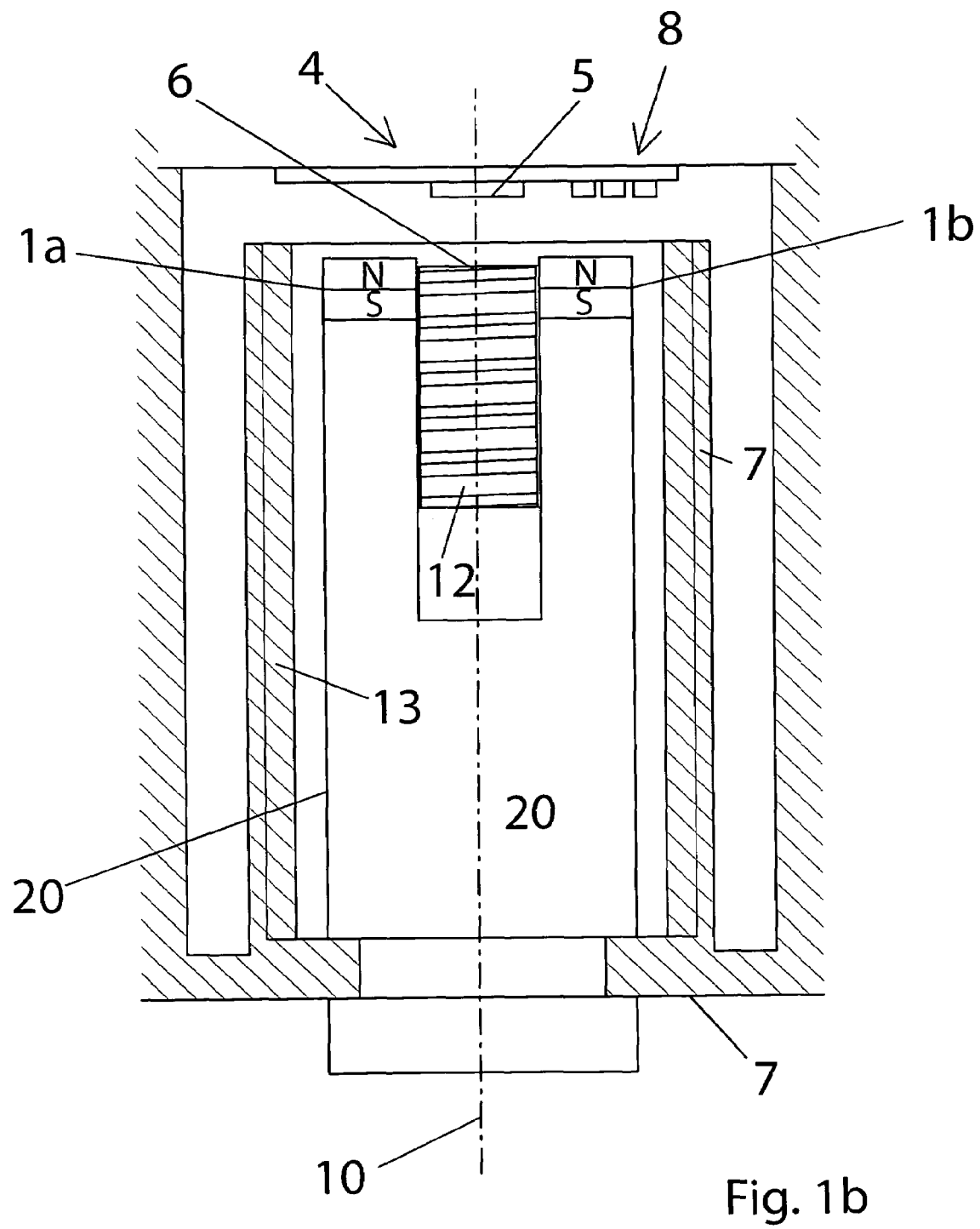

In the solution of FIG. 1, the encoder magnet 1, whose total revolutions are to be measured by the angle sensor, is disposed on the front face of a rotating body 20, which is, as illustrated best in FIG. 1b, received with its rear end in the bottom of a preferably pot shaped housing 7, so it is rotatable but fixated in axial direction 10, so that its front end protrudes into the inner cavity of the housing 7.

The rotating body 20 is provided with a slot 14 from its front end in axial direction and one respective partial encoder magnet 1a, b is disposed on the partial faces of the front end thus formed, so that the pole orientation of each partial encoder magnet is initially parallel to the rotation axis 2, thus to the axial direction 10 of the rotational body, preferably completely covering the partial face.

However, in the two partial encoder magnets 1a, b the pole orientation relative to one another is reversed, so that the north pole in the one partial face and the south pole in the other partial face of the respective partial encoder magnet 1a, b is oriented forward in axial direction 10, so that the poles disposed at the free end comprise a pole orientation 3 relative to one another transversal to the axial direction 10.

The axial slot in the front side of the rotating body 20 is much deeper compared to the axial extension of the magnets 1a, b, and it amounts to at least approximately five times that depth.

In the slot 14, e.g. a plate shaped variator 6 is guided axially movable, whose thickness corresponds exactly to the thickness of the slot 14, which, however, laterally protrudes on both sides from the rotating body 20, since it comprises a larger width than the diameter of the rotating body 20.

Figure 1C:
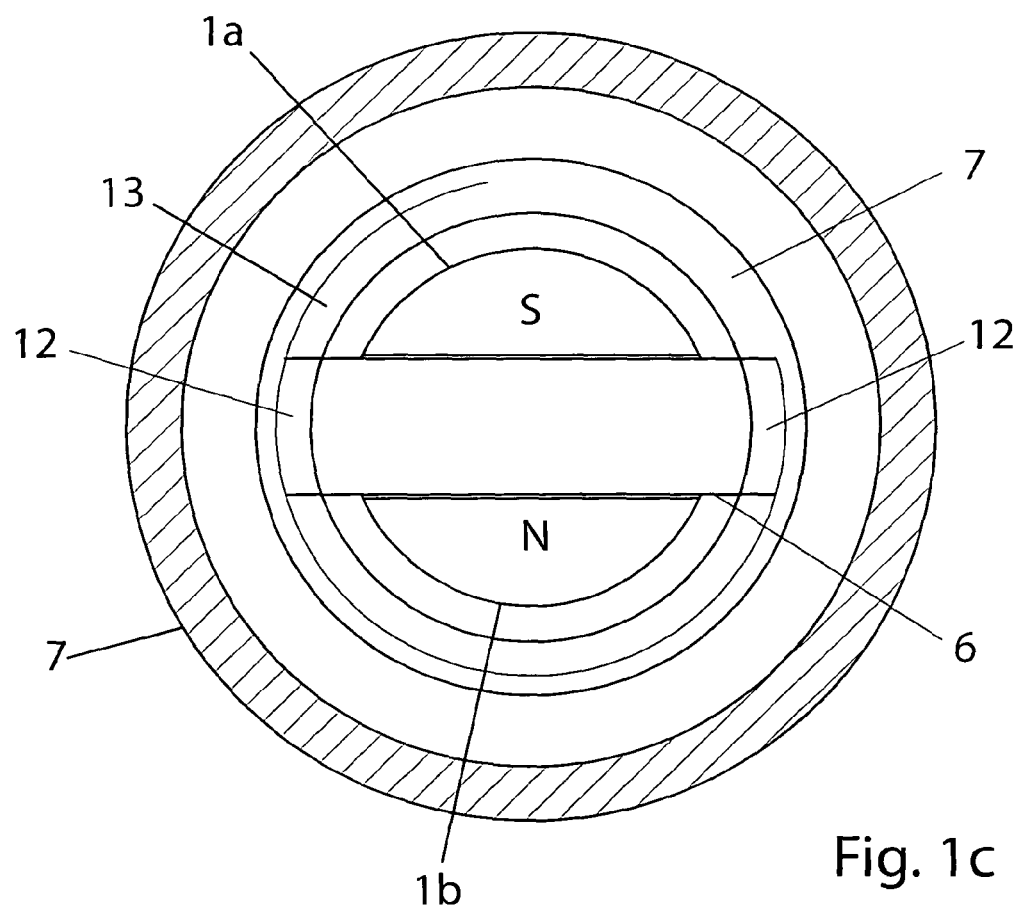
Figure 1D:
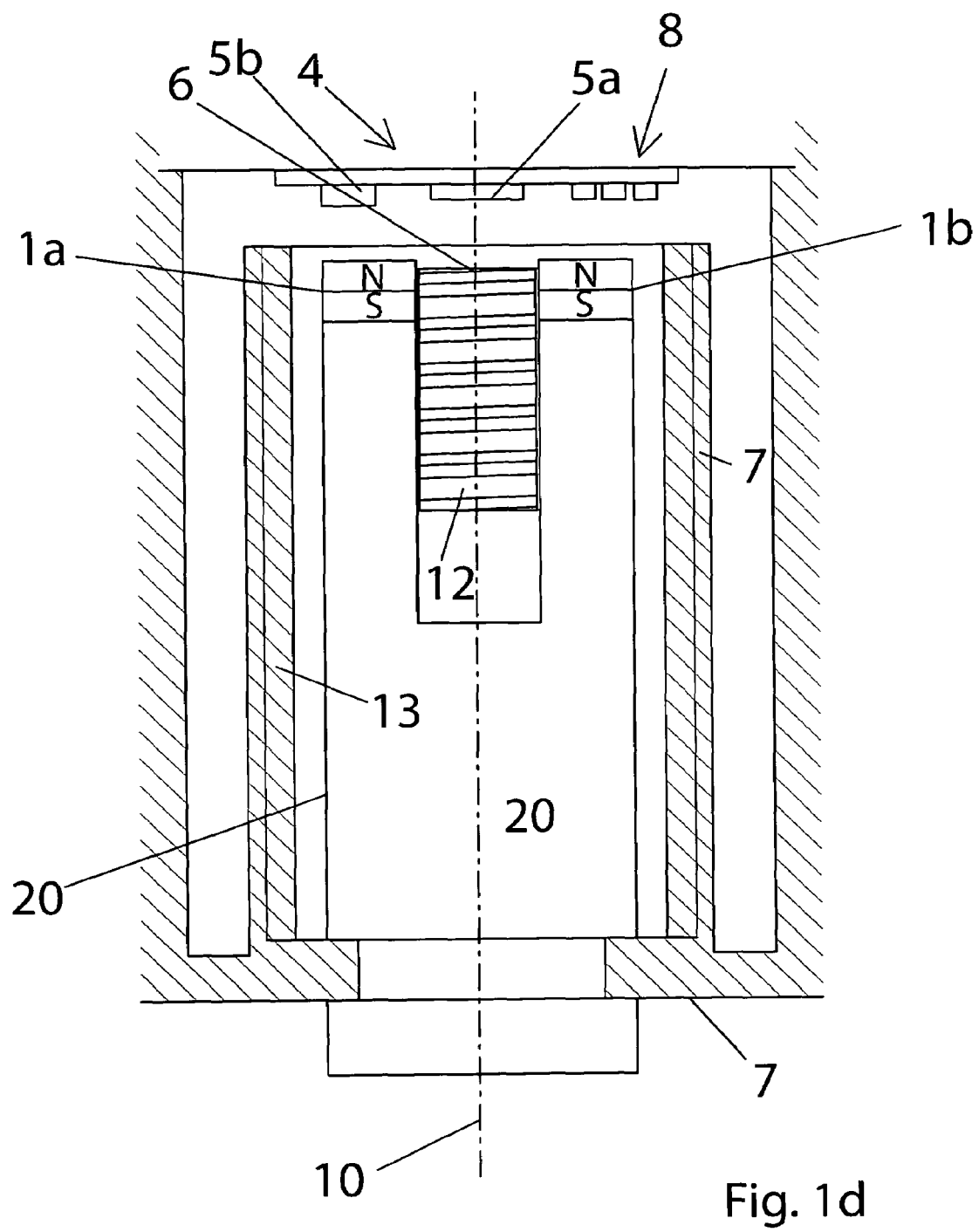
Figure 1E:
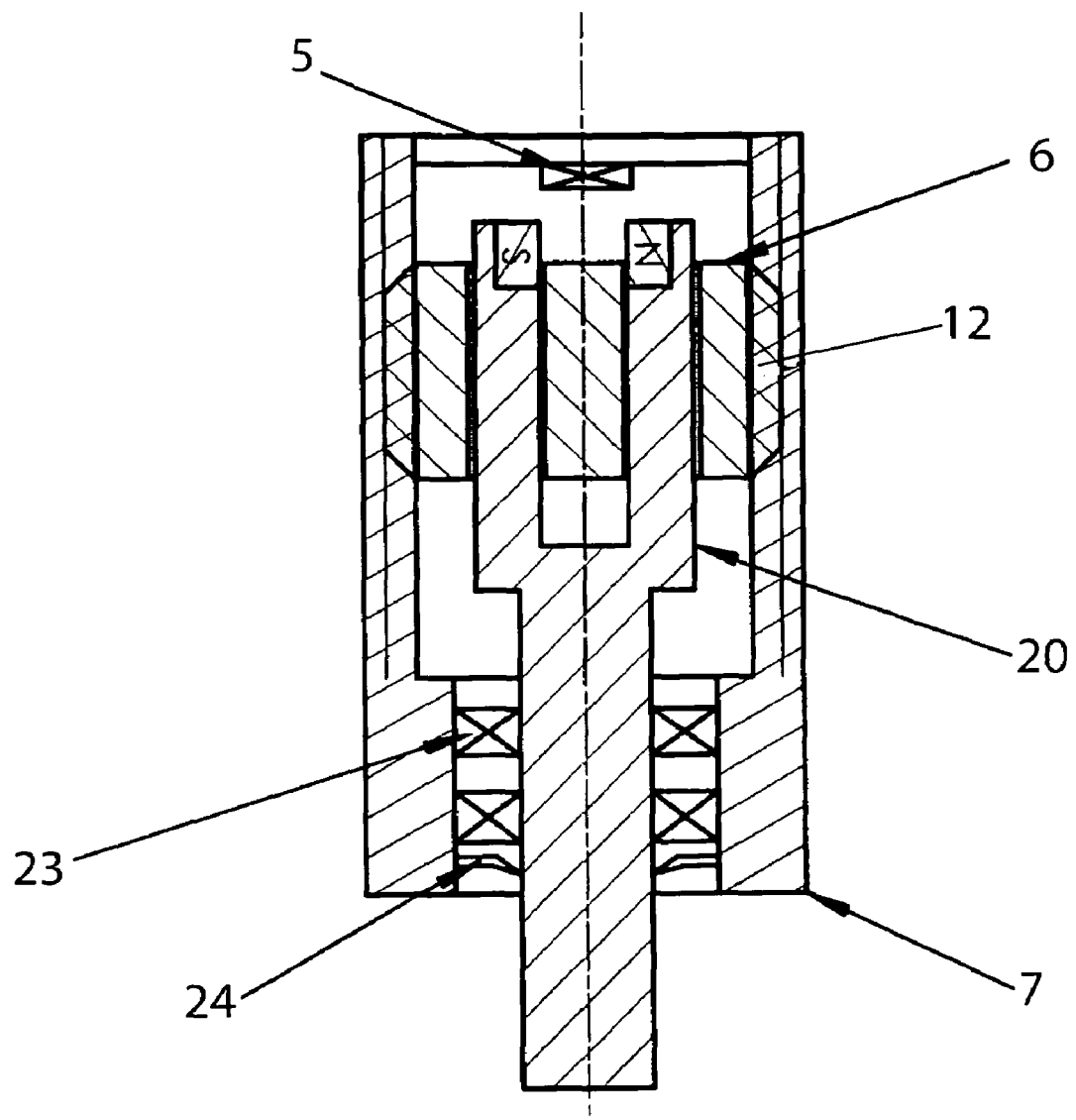

Contrary to the above, FIG. 1e shows a slightly differently shaped variator with the same basic constellation, which variator is not only inserted plate shaped into a slot of the rotating body 20, but which also additionally encloses it also on the outside, so that the variator 6, in this case is preferably configured disk shaped with a circular outer circumference, which comprises two openings opposed with respect to the center, which openings respectively pass through in longitudinal direction, through which openings the two free ends of the slotted fork shaped rotating body 20 can be inserted.

An exterior thread 12 is provided on the outward protruding lateral surfaces of the variator 6, wherein the center of said thread coincides with the rotation axis 2 of the rotating body 20, so that only respective segments of thread windings according to the thickness of the variator 6 are provided on top of one another on the outer surfaces.

As illustrated in FIGS. 1b and 1c, the housing 7 comprises an inner thread 13 on its inner circumference, which is concentric to the rotating body 20, which inner circumference corresponds to the width of the variator 6, which inner thread is engaged with the outer thread 12 on the variator 6.

FIG. 1b shows that an offset and opposed sensor unit 4 with a sensor element 5 is disposed in the free face of the rotating body 20, wherein the sensor unit 4 in the form of a circuit board can also be supported e.g. at a shoulder of the pot shaped housing 7, and by all means does not co-rotate with the rotating body 20.

Thus, when the rotating body 20, whose total rotation is to be measured, is brought into rotation, thus by more than 360°, the magnetic field 3 extending between the poles of the partial encoder magnets 1a, b opposed in transversal direction 11 will continuously change its direction with respect to the sensor element 5, which is registered by said sensor element. Thus, however, the partial encoder magnets 1a, b do not change the axial distance from the sensor element 5.

However, with increasing rotation of the rotating body 20, the variator 6, depending on the rotation direction, is moved from the bottom of the slot 14 further and further forward or backward between the partial encoder magnets 1a, b, wherein the angle sensor comprises a mechanical limiter, so that the variator 6 cannot completely reach the sensor element 5 and overall completely reach the sensor unit 4.

Thus, the variator 6 influences the electrical field between the two partial encoder magnets 1*a*, *b* with increasing insertion into the portion between said two partial encoder magnets 1*a*, *b*, depending on the variator 6 being a flux conductor component made of soft magnetic material, or being a secondary magnet.

FIG. 1*d* shows a version differing from FIG. 1*b* in that the sensor unit 4 features two separate sensor elements 5*a*, *b*.

The sensor element 5*a* is centrally located on the longitudinal axis 10, the rotation axis of the magnet, and preferably measures the partial rotation angle of the magnet. On the other hand, the second sensor element 5*b* is disposed on the circuit board slightly laterally offset, which sensor element shall determine the axial distance between the variator and the sensor unit 4.

For simplification reasons, the variator 6 is always designated as a flux conductor component without restricting the invention thereto.

Figure 2A:
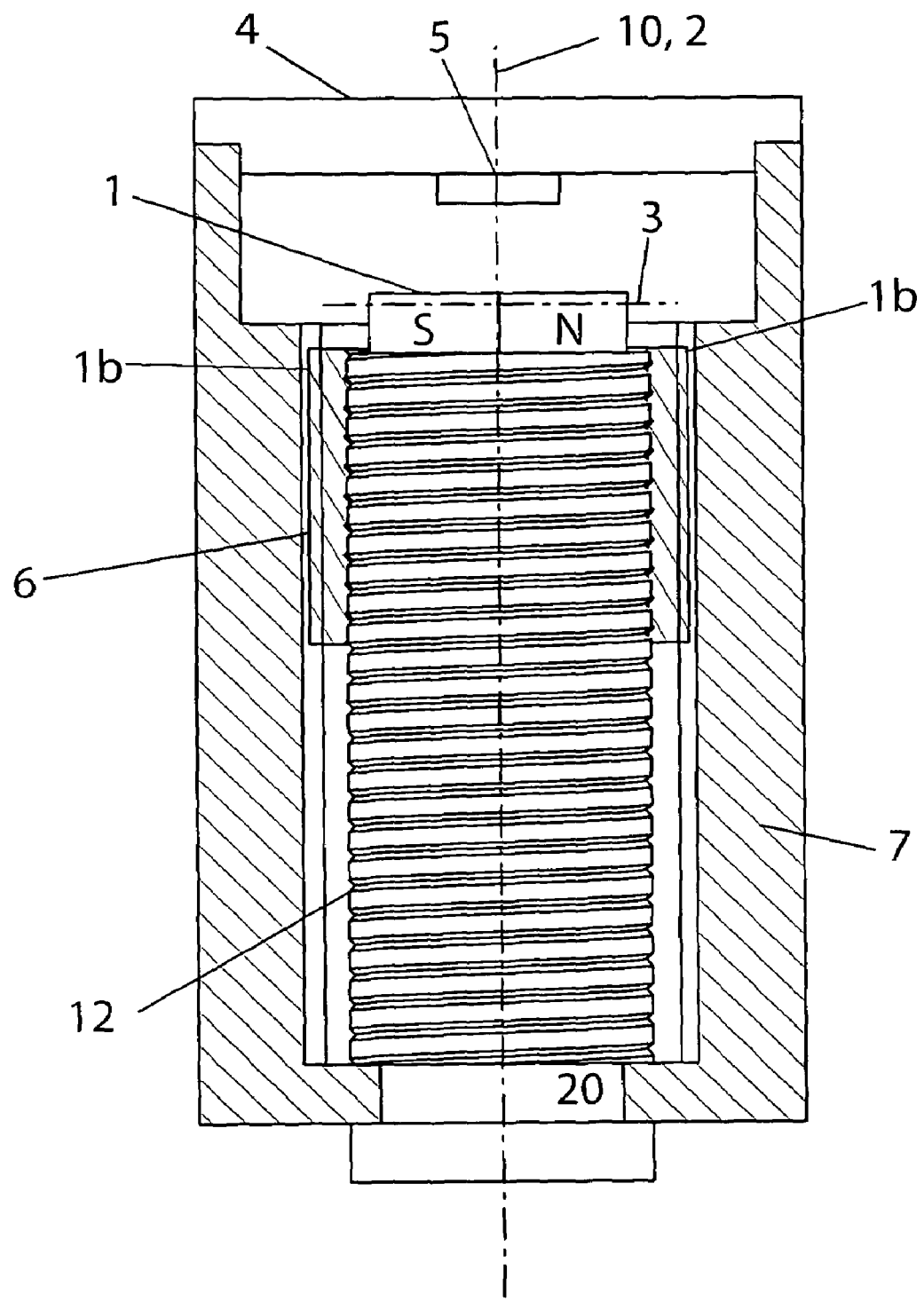
FIGS. 2(a)-(b) show a solution with a sleeve shaped variator about the encoded magnet.

FIG. 2*a* shows a solution, which differs from the solution according to FIG. 1 initially in that the rotating body 20 is not slotted at its forward free end, and accordingly the two partial encoder magnets 1*a*, *b* are directly adjacent to one another and can form a one-piece encoder magnet 1, of which only the poles (north and south pole) facing the free face are visible, so that no sequence of poles is necessary in axial direction 10.

Furthermore, the rotating body 20 now comprises an outer thread 12 on its round outer circumference, on which outer thread the sleeve shaped variator 6 runs with a respective interior thread 13, which variator concentrically surrounds the rotating body 20.

The sleeve shaped variator 6 comprises protrusions 16 on its outer circumference, e.g. on two sides opposite to one another, which protrusions are machined into longitudinal grooves 15, extending in longitudinal direction 10 in the inner surfaces of the in turn preferably pot shaped housing 7, thus allowing a longitudinal movement, but no rotation of the sleeve shaped variator 6.

Also here, the magnetically sensitive sensor element 5 of a sensor unit 4 is disposed in turn axially offset opposite to the free face of the rotating body 20, thus opposed to the encoder magnet 1 rotatably disposed thereon, which sensor unit 4 is mounted to the housing 7 and therefore does not rotate with the rotating body 20.

This way, when the rotating body 20 is driven in rotation, the pole axis 3 of the encoder magnet 1, which pole axis extends in transversal direction 11, is rotated with respect to the sensor element 5, however, it maintains its axial distance from the sensor element 5. On the other hand, driven by the threaded connection, the sleeve shaped variator 6 changes its distance from the sensor element 5 by moving more or less laterally past the encoder magnet 1, which does not laterally protrude beyond the face of the rotating body 20, thus influencing the field of said encoder magnet.

Figure 2B:
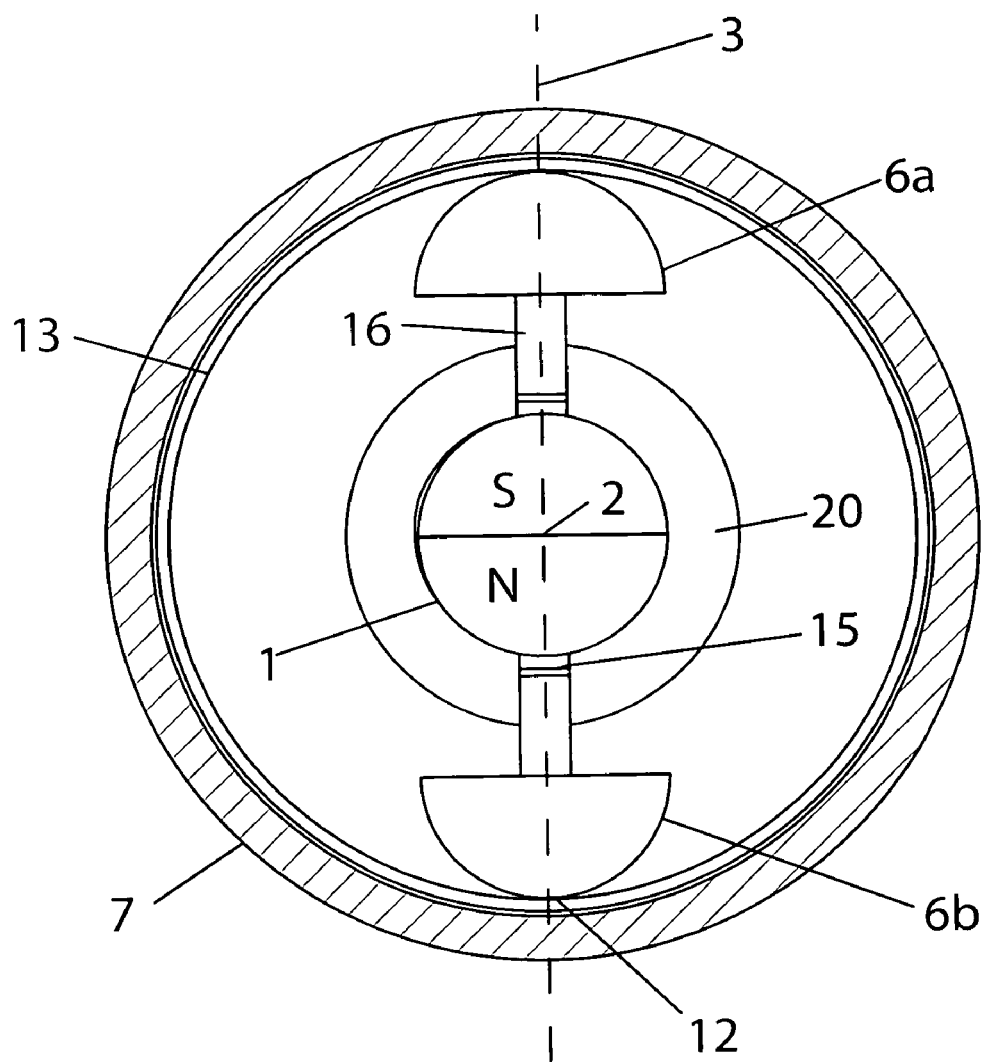

FIG. 2 shows a slightly different variant, since the variator 6 therein does not surround the rotating body 20 as a sleeve over its entire circumference, but only as partial variators 6*a*, *b* disposed on two sides opposed to one another, which variators engage longitudinal grooves 15 provided in the outer circumference of the rotating body 20 by means of radially inward oriented protrusions 16, and therefore co-rotate with the rotating body 20, but are simultaneously longitudinally movably guided thereon.

Thus, the outer thread 12 is now disposed on the outside of the partial variators 6*a*, *b*, which mesh with an inner thread 13, which is disposed in this configuration on the internal circumferential surfaces of the housing 7, concentrically surrounding the rotating body 20.

Also here, the encoder magnet 1 is disposed on the frontal free face of the rotating body 20, and in turn axially offset opposite thereto, the sensor unit 4 with a sensor element 5 is disposed on the rotation axis 2, which sensor unit is not visible in FIG. 2. Thus, also here, an effect occurs, that with increasing rotation of the rotating body 20, the partial variators 6*a*, *b*, which are preferably disposed on the pole direction 3 of the encoder magnet 1, co-rotate with the encoder magnet 1, but in turn move forward more or less in axial direction over the encoder magnet 1, thus changing its distance from the sensor element 5.

Figure 3:
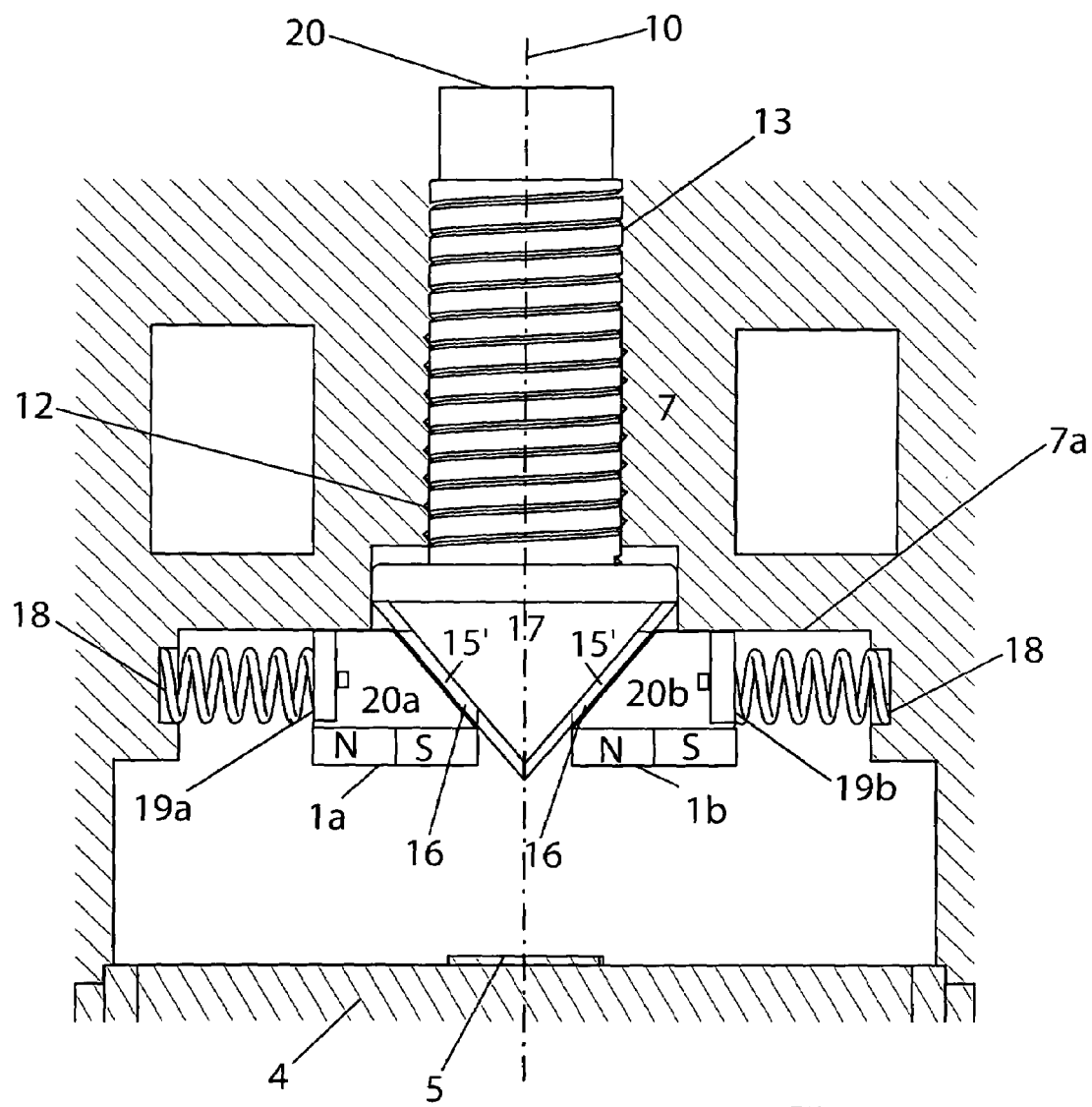
FIG. 3 shows a solution for changing the transversal offset of the encoder magnets.

FIG. 3 shows a solution in which the variator 6 neither has to be a flux conductor component nor a secondary magnet, since it only changes the distance of the partial encoder magnets 1*a*, *b* in transversal direction 11 from the rotating axis 2, while its distance from the sensor element 5 in axial direction 10 remains constant.

This can be performed in several ways.

In the variant illustrated in FIG. 3, the rotating body 20 is provided in several pieces for this purpose by rotatably supporting a round base body 20, as it is typical rotatably in a housing 7, but this time, it is also being moved in axial direction 10, since it bears an exterior thread 12 on its outside, which exterior thread meshes with the respective interior thread in the housing 7.

The forward free end of the base body 20 is configured as a round cone 17, in whose conical surfaces longitudinal grooves 15' are machined in two opposite directions.

The cone 17 protrudes beyond the base surface of the pot shaped housing 7, in whose bottom the base body 20 is guided in a thread.

Rotating body components 20*a*, *b* contact the cone 17, engaging one of the longitudinal grooves 15 provided in the outer circumference of the rotating body 20 respectively by means of radially inward oriented protrusions 16, thus co-rotating with the rotating body 20, while simultaneously being supported longitudinally movable therein.

Partial encoder magnets 1*a*, *b* are disposed on the front face of said rotating body components, which partial encoder magnets are disposed opposite to the sensor element 5 and respectively comprise a pole orientation in transversal direction 11 and comprise poles alternating in sequence in transversal direction 11, wherein each particular partial encoder magnet 1*a* or 1*b* comprises a north pole and a south pole.

The rotation body components 20*a*, *b* can thus be pressed against the conical surface of the cone 17 from the outside by a respective spring 18, which rotating body components are supported on the radial outside at the housing 7 and which slide in circumferential direction on the rotating body components 20*a*, *b*, preferably at their inner ends by means of a shoe 19*a*, *b*, contacting said rotating body components, since the springs 18 do not co-rotate with the rotating body components 20*a*, *b*.

Thus, a form locked connection in axial direction 10 between the shoe 19*a*, *b* and the respective rotating body component 20*a*, *b* can additionally prevent a position change of the rotating body components 20*a*, *b* in axial direction.

In this case the cone 17, or better the interaction between the conical surfaces at the cone 17 and the opposite surfaces at the rotating body components which support the encoder magnets 1*a*, *b* and which are modulated the with respect to their transversal distance through the axial movement of the cone 17, acts as a variator.

Figure 4:
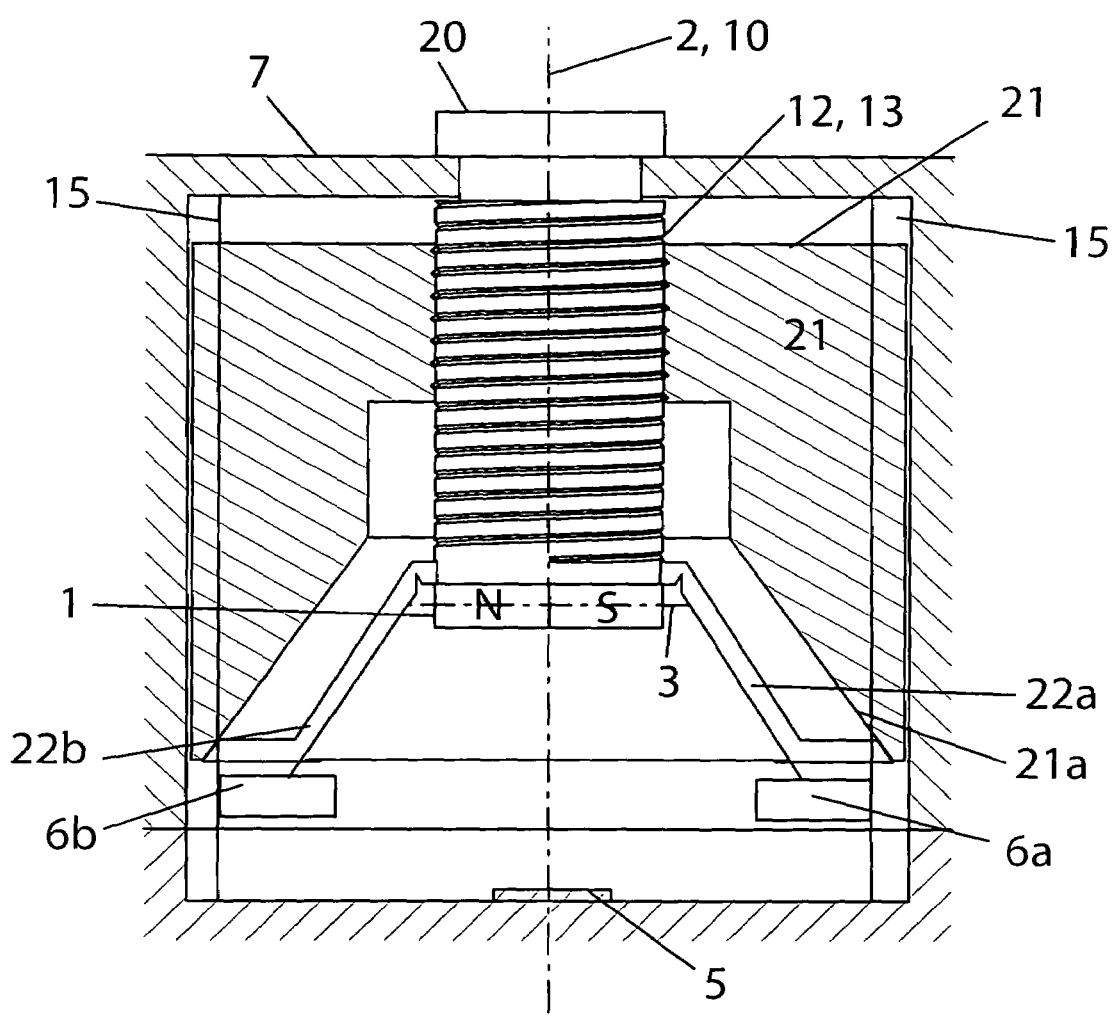
FIG. 4 shows a solution with an aperture shaped variator.

FIG. 4 shows a solution in which the variator is divided into two or more variator components 6a, b opposite to one another with respect to the rotation axis 2 and disposed in axial direction between the encoder magnet 1, which in turn is disposed on the face of a rotation body 20, axially fixated in the housing 7 and the opposite sensor element 5. The transversal movement of the two or more variator components 6a, b distributed about the circumference thus acts like a type of variable aperture between the encoder magnet 1 and the sensor element 5.

This is accomplished by disposing the variator components 6a, b at the free end of support arms 22a, b, respectively carrying a variator component 6a, b, and protruding forward at a slant angle and outward from the front portion of the rotating body 20.

The support arms 22a, b are configured pivotable, e.g. through their own elasticity, so that they can extend more or less outward, but they are preloaded in radial outward direction through their inner tension.

The support arms 22a, b are pressed inward by disposing a conical sleeve 21, which comprises a negative concave cone on its front face, concentrically about the rotating body 20, and providing it axially movable in the housing 7 in longitudinal direction 10 by engaging longitudinal grooves 15 provided in its inner circumference in a form locking manner. The longitudinal drive is in turn performed by an exterior thread on the outside of the rotating body 20, which exterior thread is engaged with an inner thread 13 in the pass-through opening of the conical sleeve 21.

The variator components 6a, b or the support arms 22a, b contacting the inner conical surfaces of the conical sleeve 21 are increasingly pressed radially inward and the aperture is closed more and more through pushing of the conical sleeve 21 forward in axial direction 10.

When sliding the conical sleeve 21 backward, the arms 22a, b move outward again due to their preloading or spring elasticity.

REFERENCE NUMERALS AND DESIGNATIONS 1 encoder magnet
1a, b encoder magnet component
2 rotation axis
3 pole orientation
4 sensor unit
5 sensor element
6 variator
6a, b variator components
7 housing
7a bottom surface
8 processing unit
10 axial direction
11 transversal direction
12 exterior thread
13 interior thread
14 slot
15, 15' longitudinal groove
16 protrusion
17 cone
18 spring
19a, b shoe
20 rotating body, base rotating body
20a, b rotating body components
21 conical sleeve
21a inner cone surface
22a, b support arms
23 support
24 lip seal

What is claimed is:

1. A multi-turn angle sensor, said sensor comprising:
   a. at least one encoder magnet (1) having a mechanical drive, rotatably supported about a rotation axis (2);
   b. a magneto sensitive sensor unit (4) with a sensor element (5), which is permeated by the magnetic field of the encoder magnet (1);
   c. on the one hand, detecting and putting out the rotation angle of the pole direction of the encoder magnet (1) about the rotation axis (2);
   d. on the other hand, detecting and putting out the absolute value of the magnetic field applied to the sensor element (5) of the sensor unit (4); wherein
   e. the axial distance between the at least one encoder magnet (1) and the sensor element (5) is constant; and
   f. an additional field variator (6) which changes the magnetic field provided at the sensor element (5) as a function of the total rotation angle of the encoder magnet (1) and wherein the additional field variator (6) is moved by means of a threaded spindle, on which a spindle nut runs.

2. The multi-turn angle sensor according to claim 1, wherein the field variator (6) is configured, so that the alteration of the magnetic field caused thereby is a reproducible function of the total rotation angle of the encoder magnet (1).

3. The multi-turn angle sensor according to claim 1 wherein the magnetic field is measured by the sensor unit (4) and/or influenced by the field variator (6) by measuring or influencing the magnetic induction or the magnetic flux density or the field strength.

4. The multi-turn angle sensor according claim 1 wherein the sensor element (5) is provided flat and disposed in a radial plane relative to the rotation axis (2).

5. The multi-turn angle sensor according to claim 1, wherein the field variator (6) is a flux conductor component, in particular made of soft magnetic material, like e.g. soft iron, whose position in the angle sensor varies as a function of the total rotation angle of the encoder magnet (1).

6. The multi-turn angle sensor according to claim 1, wherein the field variator (6) is a secondary magnet, whose pole orientation comprises the axial direction (10) as one component, in particular as the only component, and whose position in the angle sensor varies as a function of the total rotation angle of the encoder magnet (1).

7. The multi-turn angle sensor according to one of the preceding claims 5 or 6 wherein the field variator (6) comprises a flux conductor component and also a secondary magnet.

8. The multi-turn angle sensor according to claim 1, wherein the field variator (6) is disposed on the backside of the encoder magnet (1) or of the sensor element (5), facing away from the respective other element, and the axial distance (10) of said variator from said element varies as a function of the total rotation angle of the encoder magnet (1).

9. The multi-turn angle sensor according to claim 1, wherein the field variator (6) is configured tubular, in particular pot shaped, and moves axially forward with its open face in front as a function of the total rotation angle of the encoder magnet (1) and moves from behind over the encoder magnet (1) or over the sensor element (5).

10. The multi-turn angle sensor according to claim 1, wherein the tubular, in particular pot shaped, field variator (6) comprises an axially extending center pin in the center of its cross section and the encoder magnet (1) is configured as an angular magnet, concentrically extending about the rotation axis (2), which penetrates into the space between the center pin and the tube contour of the field variator (6).

11. The multi-turn angle sensor according to claim 1, wherein the field variator (6) can be increasingly inserted transversally to the axial direction (10) between the encoder magnet (1) and the sensor element (5) as a function of the total rotation angle of the encoder magnet (1).

12. The multi-turn angle sensor according to claim 1, wherein the field variator (6) is comprised of plural variator components (6a, b) distributed about the circumference, whose radial distance from the rotation axis (2) is adjusted synchronously and jointly as a function of the total rotation angle of the encoder magnet (1).

13. The multi-turn angle sensor according to claim 1, wherein the field variator (6) is shaped in particular in axial direction (10), so that the linear movement of the field variator (6) changes the field strength provided at the sensor element (5) in a linear manner.

14. The multi-turn angle sensor according to claim 1 wherein the encoder magnet (1) is comprised of two encoder magnet components (1 a, 1 b) offset in transversal direction and the field variator (6) is increasingly inserted in axial direction (10) and in radial direction between the encoder magnet components (1a, 1b) as a function of the total rotation angle of the encoder magnet (1).

15. The multi-turn angle sensor according to claim 1, wherein the cross section of the field variator (6) changes with respect to its movement direction, so that in particular a linear context between the travel distance of the field variator (6) and the resulting remaining field strength at the sensor element (5) is provided.

16. The multi-turn angle sensor according to claim 1, wherein the field variator (6) is conically broadened or tapered in movement direction.

17. The multi-turn angle sensor according to claim 1, wherein the processing unit (8) associated with the sensor element (5) comprises a memory, in which interpolation values for the magnetic field with respect to the defined total rotation angle of the encoder magnet (1) are stored.

18. The multi-turn angle sensor according to claim 17, wherein the support values are determined at the first start up of the angle sensor, and are in particular determined anew after predetermined time intervals.

19. The multi-turn angle sensor according to claim 17, wherein the interpolation values respectively represent an integer number of total revolutions of the encoder magnet (1).

20. The multi-turn angle sensor according to claim 1, wherein the sensor unit (4) comprises two sensor elements (5a,b), of which the one sensor element (5a) detects and puts out the absolute value of the magnetic field provided therein, and the other sensor element (5b) detects and puts out the rotation angle of the pole direction of the encoder magnet (1) and the rotation axis (2).

21. The multi-turn angle sensor according to claim 1, wherein the variator comprises a magnetically permeable liquid, in particular a Ferro fluid or a magneto rheological fluid.

22. The multi-turn angle sensor according to claim 14, wherein the variator (6) surrounds the two encoder magnet components (1a, b), also on the outside, viewed in axial direction, and comprises in particular a round outer circumference.

23. The multi-turn angle sensor according to claim 1, wherein the variator (6) varies the magnetic field of the encoder magnet (1) as a function of the total rotation angle of the encoder magnet (1).

* * * * *